W. C. HINDS.
GRAIN SEPARATOR.
APPLICATION FILED AUG. 5, 1919.
1,333,757.
Patented Mar. 16, 1920.
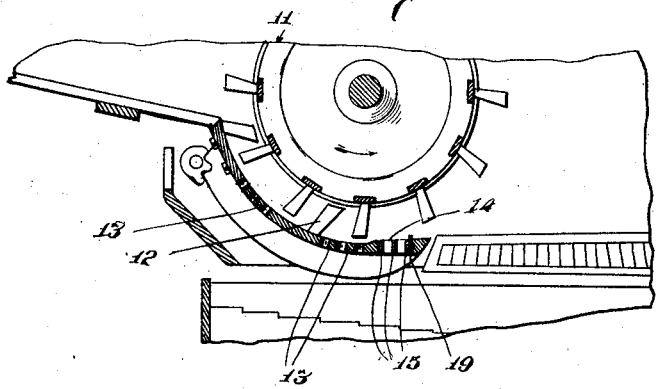
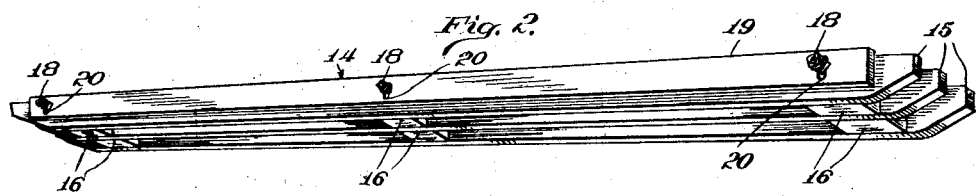
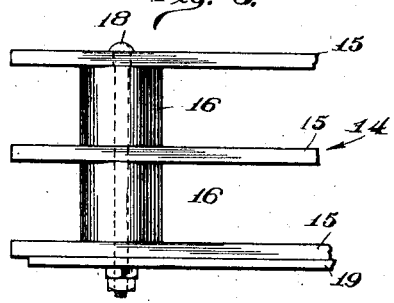
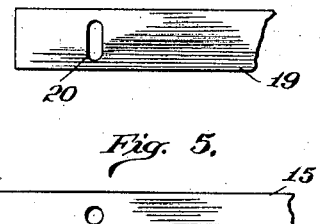
Inventor
Wheeler C. Hinds
By Gillson & Gillson
Attorneys

UNITED STATES PATENT OFFICE.

WHEELER C. HINDS, OF GENEVA, ILLINOIS.

GRAIN-SEPARATOR.

1,333,757. Specification of Letters Patent. Patented Mar. 16, 1920.

Application filed August 5, 1919. Serial No. 315,422.

*To all whom it may concern:*

Be it known that I, WHEELER C. HINDS, a citizen of the United States, and resident of Geneva, county of Kane, and State of Illinois, have invented certain new and useful Improvements in Grain-Separators, of which the following is a specification, and which are illustrated in the accompanying drawings, forming a part thereof.

The invention relates to threshing machines wherein the grain is released from the ears by the coaction of a revolving toothed cylinder and a plurality of stationary toothed bars arranged to provide a curved breast commonly termed the concave.

The usual practice in these machines has been to alternate the toothed bars of the concave with grating sections having relatively narrow openings for the passage of grain through the same, and to supply such a grating section beyond the rearmost row of concave teeth. Sometimes instead of the rear grating section a "blank" or imperforate section has been supplied by the separator manufacturers through which no grain could pass. A defect in the practice has been that the grain could not freely escape from the straw when released from the ears whereby a larger proportion of the grain was swept on to the shakers than could be separated by these devices, with the result that not all of the grain was recovered.

An object of the present invention is to provide a grating having relatively wide openings through which grain may immediately fall away from the straw when released from the ears, and further to provide a positive stop or abutment by which the grain, which is thrown forwardly by the cylinder, is deflected through the said openings.

A form of the invention chosen for purposes of illustration is shown in the accompanying drawings, in which:—

Figure 1 is a detail sectional view taken centrally through a separator cylinder and concave, Fig. 2 is a perspective view of a form of grating which may be used in carrying out the invention with the said stop or abutment applied thereto, Fig. 3 is a detail plan view of the grating and abutment, Fig. 4 is a detail side view of the abutment, and Figs. 5 and 6 show details of the grating; Fig. 5 being a detail side elevation of one of the grating bars and Fig. 6 being a perspective view of a spacing block in inverted position.

A usual form of toothed cylinder 11, and a concave comprising alternate toothed bars and gratings 12 and 13, is shown in Fig. 1. The structure embodying the present invention is preferably located immediately beyond the last grating bar 13 of the concave.

When the grain and straw have passed the last of the concave teeth, substantially everything that is done in the whole separating machine to loosen the grain from the ears has been done. The present invention depends upon the theory that the grain should be separated from the straw at this point instead of being swept on with the straw and laboriously shaken therefrom during its course through the remainder of the machine. Separation of the grain and straw at this point is facilitated by the fact that the grain, being heavier than the straw, will travel in the lower portion of the stream of straw and grain, and, due to the blows of the cylinder teeth traveling at a high velocity, will tend to leave the path of those teeth at a tangent thereto.

For the purpose of allowing the grain to drop away from the straw there is shown an open grating 14 comprising a plurality of bars, as 15, which extend in the direction of the length of the cylinder 11 and are separated by spacing blocks 16, the bars and spacing blocks being tied together by bolts, as 18. The assembled grating is preferably of such a length and width as to be interchangeable with the "blank" or solid bar (not shown) usually supplied by the separator manufacturers to provide an extension of the concave beyond the last grating bar 13.

To positively arrest the grain which is thrown forwardly by the cylinder, so that it may fall through the relatively wide spaces in the grate 14, an abutment in the form of a thin bar 19 is provided at the far edge of the grating. As shown, the bar 19 is secured against the back of the last one of the bars 15 by the same bolts 18 which unite the parts of the grating and it is made adjustable in height by being provided with slotted openings for the said bolts back of the bars 15.

It has been found in practice that with the grating 14 so located that a height of abutment 19 of substantially one-quarter of an inch will just clear the cylinder teeth, nearly all the grain will be recovered through the grating. The chaff, being the lightest portion of the material passing the cylinder, is swept over the abutment 19 with the straw, leaving the grain substantially clean. This action is so complete that it has been found practicable to operate a machine of the usual type, except for the present invention, without the operation of the fan commonly employed for separating the chaff from the grain. It will also be understood that there is very little grain to be separated from the straw upon the shakers (not shown). These accordingly operate more effectively and substantially all of the grain is recovered.

I claim as my invention:

1. In a grain separator, in combination, revoluble threshing means, means lying in common surface to allow the grain to drop away from the straw immediately upon being released from the ears, and means projecting above said surface to a position closely adjacent a point of tangency with the path of said revoluble threshing means to arrest the grain and over which the straw and chaff may pass.

2. A grating for a grain separator concave comprising a plurality of bars spaced relatively widely apart, their upper edges lying substantially in a common surface, an abutment at the far edge of the grating projecting above the surface thereof.

3. A grating for a grain separator concave comprising a plurality of bars spaced relatively widely apart, an abutment carried by the grating at its far edge and projecting above the same, and means for vertical adjustment of the abutment.

4. A grating for a grain separator concave comprising a plurality of relatively thin bars, relatively thick spacing blocks between said bars, bolts passed through said bars and blocks and an abutment projecting above the bars and spacing blocks adjustably secured thereto by said bolts.

WHEELER C. HINDS.